United States Patent [19]

Newlin

[11] Patent Number: 5,071,553

[45] Date of Patent: Dec. 10, 1991

[54] SELF RETAINING FLUID FILTER

[76] Inventor: Robert E. Newlin, P.O. Box 1186, Idabel, Okla. 74745

[21] Appl. No.: 60,222

[22] Filed: Jun. 10, 1987

[51] Int. Cl.[5] .......................................... B01D 29/05
[52] U.S. Cl. ................................ 210/455; 210/495; 210/497.2; 55/480; 55/511; 55/DIG. 5; 55/DIG. 31
[58] Field of Search ............... 210/451, 455, 460, 461, 210/463, 485, 495, 497.01, 497.2; 55/480, 481, 483, 492, 493, 497, 505, 507, 511, DIG. 5, DIG. 31, 991, 511, 524, 487; 29/163.5 F; 156/62, 60, 297

[56] References Cited

U.S. PATENT DOCUMENTS

| | | | |
|---|---|---|---|
| 1,585,418 | 5/1926 | Rosenberg | 210/485 |
| 2,138,736 | 11/1938 | Gaarder | 55/515 |
| 2,316,526 | 4/1943 | McDonald | 210/495 |
| 2,685,345 | 8/1954 | Lindner | 55/515 |
| 3,019,854 | 2/1962 | O'Bryant | 55/491 |
| 3,034,772 | 5/1962 | Schulz | 55/387 |
| 3,127,259 | 3/1964 | Boylan | 55/511 |
| 3,150,945 | 9/1964 | Baggeson | 55/493 |
| 3,292,349 | 12/1966 | Cuta | 210/485 |
| 3,333,404 | 8/1967 | Klun | 55/492 |
| 3,388,535 | 6/1968 | Nash | 55/492 |
| 3,418,794 | 12/1968 | Roberts | 210/495 |
| 3,679,059 | 7/1972 | Wyatt et al. | 210/541 |
| 3,774,377 | 11/1973 | Bishop | 55/493 |
| 3,810,350 | 5/1974 | Scholl | 55/493 |
| 3,877,909 | 4/1975 | Hansen | 55/487 |
| 4,047,914 | 9/1977 | Hansen et al. | 55/492 |
| 4,394,147 | 7/1983 | Caddy et al. | 55/492 |
| 4,689,058 | 8/1987 | Vogt et al. | 55/511 |

Primary Examiner—W. Gary Jones
Assistant Examiner—Wanda L. Millard
Attorney, Agent, or Firm—Sherman Levy

[57] ABSTRACT

A fluid filter and a method of constructing a fluid filter which will independently retain itself in a fluid passageway includes a sheet of filter media and a retainer which is attachable to one side of the filter media. The retainer may be sized to frictionally engage the walls of the fluid passageway or may be of a resilient material which allows the retainer to resiliently engage the walls of the passageway. The retainer is attached around only the periphery of the filter media with the central portion of the filter media being free with the respect to the retainer. The filter media has flexible edges which extend beyond the retainer to seal the passageway so that all fluid flowing through the passageway will flow through the filter media.

5 Claims, 1 Drawing Sheet

U.S. Patent
Dec. 10, 1991
5,071,553
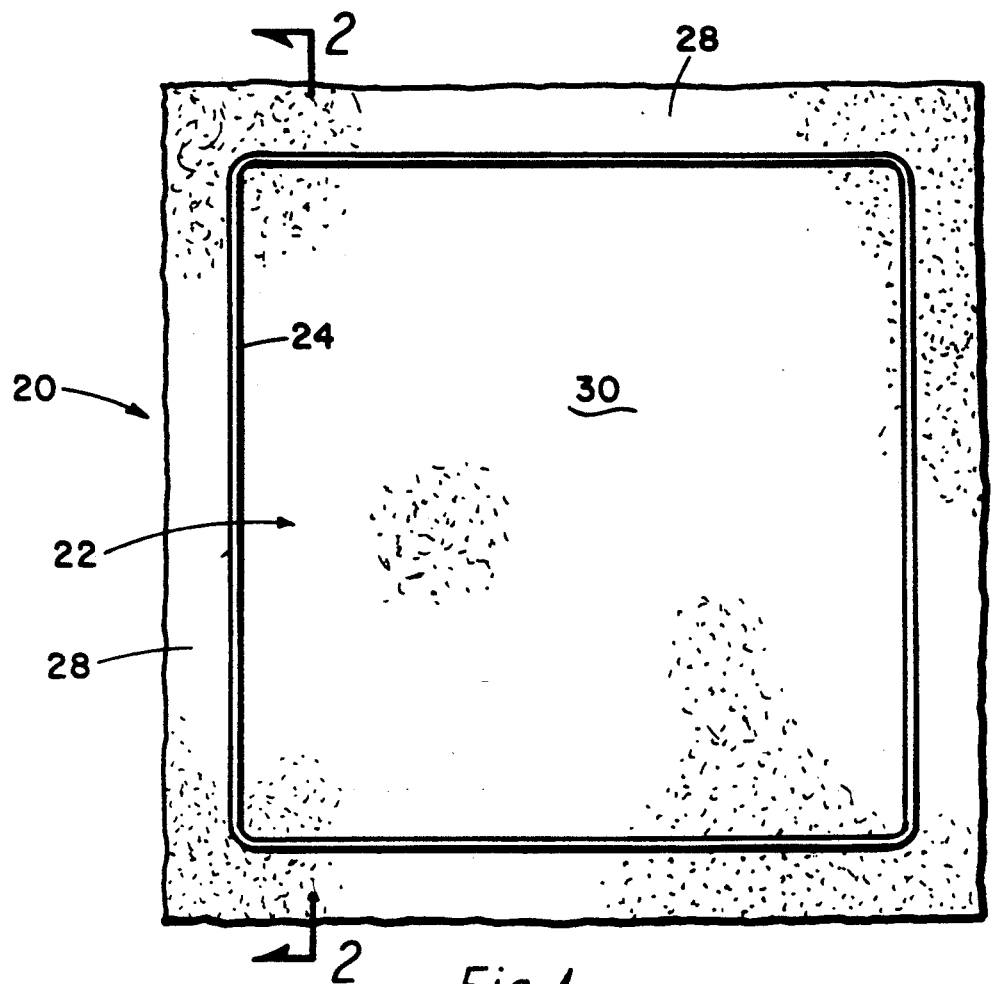
Fig. 1
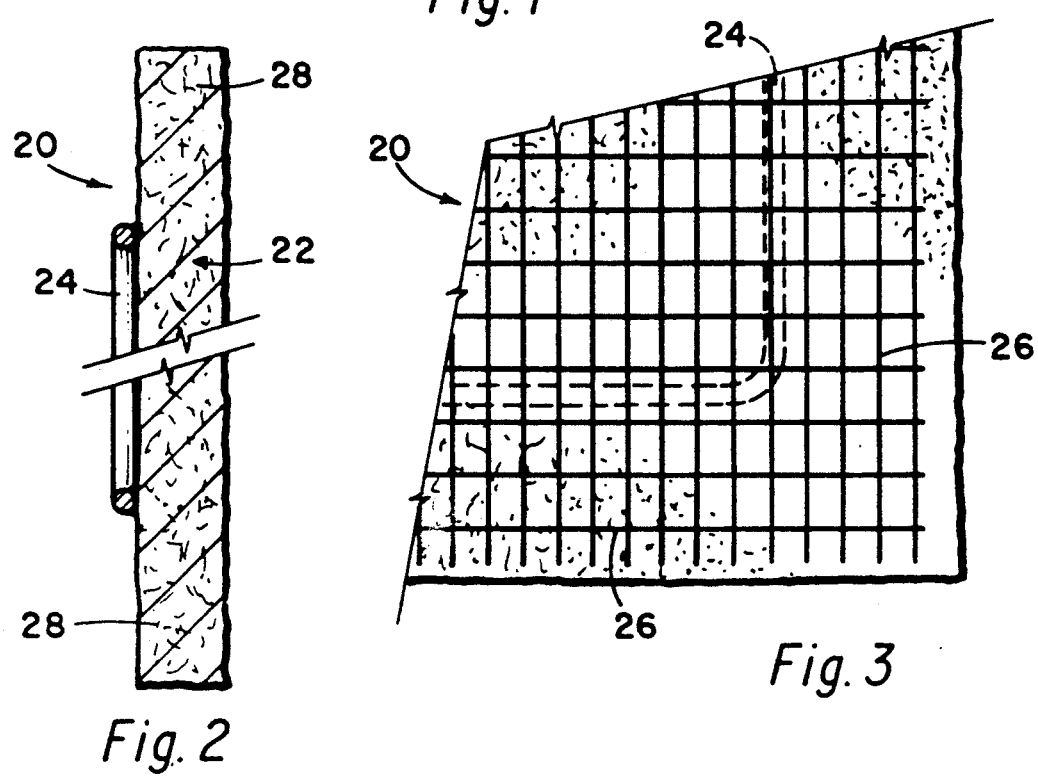
Fig. 2
Fig. 3

SELF RETAINING FLUID FILTER

BACKGROUND OF THE INVENTION

This invention relates to fluid filters and methods of constructing fluid filters and more particularly to fluid filters used in air-makeup filtration systems.

Fluid filters, particularly air-makeup filters for commercial and residential buildings, have been known for some time. For example U.S. Pat. No. 2,138,736, issued to Gaarder, provides a filter pad comprised of a fibrous material between a top screen and a bottom screen of very coarse grid. The fibrous material extends beyond the edges of the screens. The top and bottom screens are joined and, at the same time, rigidly separated by posts, which are welded to the lower screen and provided with open hooks, which in assembling the pad are passed over the upper grid and closed. The fibrous material extends beyond the edges of the screens to provide a dust seal when the assembled filter is placed into a frame.

Another example is U.S. Pat. No. 2,685,345, issued to Lindner, which provides an air filter pad having holder frames comprised of continuous border frames and crossed members. The crossed members are diagonally disposed and are welded at their ends to the corners of the border members. The holder frames are held upon a filter pad by means of inwardly facing u-shaped clips. The arms of these clips overlap the frame border members and terminate in outwardly facing hooks. The arms of the clips are engaged with the border members of the frame by compressing a filter pad through pressure applied to the opposed portions of the border frames until the arms of the clips and their outwardly facing hooks can be slipped over the border members. The edges of the filter pad material will extend beyond the holder frames and are compressible edges so that the filter may be inserted and self supported in conduits or ducts of considerable variation in dimensions.

There are several drawbacks to the air filters known in the art. The known air filters require a rigid frame on each side of the filter pad and the opposing frames must be cross-connected to retain the filter pads within the frames. This construction requires considerable assembly and relatively expensive materials. Because of the expense of the rigid frames and filters the prior filters are designed to allow cleaning and/or replacement of the filter pads. The rigid frames are bulky and require relatively greater shipping and storage space. The presence of metal screens and cross members to support the central portions of the filter pad present a danger to downstream equipment. As the filters become laden with filtered matter the pressure drop across the filter increases. This pressure drop is supported by the cross members and screens in the central portion of the filter. Eventually the screens or cross members may fatigue and rupture sending portions of the screen and cross members into the downstream equipment.

SUMMARY OF THE INVENTION

Accordingly, in view of the shortcomings existing in prior filters, it is an object and advantage of this invention to provide a fluid filter which does not require the presence of frames on both sides of the filter media.

It is a further object and advantage of this invention to provide a fluid filter in which there are no mechanical or physical interconnections between frames on each side of the filter media.

It is a further object and advantage of this invention to provide a fluid filter in which there are no mechanical connections between the filter media and the retaining means which retains the filter media in a fluid passageway.

It is a further object and advantage of this invention to provide a fluid filter in which the retainer means and filter media are an integral assembly.

It is a further object and advantage of this invention to provide a fluid filter in which the retainer means is chemically bonded to the filter media.

It is a further object and advantage of this invention to provide a fluid filter in which is disposable and inexpensive.

It is a further object and advantage of this invention to provide a fluid filter in which the retaining means has an open center, the central portion of the filter media being free with respect to the retaining means with no screen, cross members, or frame present in the central portion of the retaining means and filter media.

It is a further object and advantage of this invention to provide a fluid filter in which the retainer means functions as a retaining ring or snap ring, not as a structural frame.

It is a further object and advantage of this invention to provide a fluid filter in which only the filter media ruptures if the filter becomes laden with filtered matter and in which there are not screens, cross members, or structural pieces across the central portion of the filter media to rupture and damage downstream equipment.

It is a further object and advantage of the present invention to provide a fluid filter which is resiliently compressible and allows higher density packing of approximately 4:1 over existing filters, thereby allowing economies of packaging, shipping, storage, etc.

It is a further object and advantage of the present invention to provide a fluid filter in which the central portion of the filter media and retainer means are open allowing the central portion of the media to flex and pocket when there is fluid flow through the filter.

It is a further object and advantage of the present invention to provide a fluid filter of higher efficiency than previously known filters.

It is a further object and advantage of the present invention to provide a fluid filter, which when assembled in a 24"×24" size will filter more than 3,000 cubic feet per minute of air without rupturing.

The fluid filter and method of constructing a fluid filter of the present invention includes sheet of filter media and retainer means which may be attached to only one side of the filter media. The retainer means may be sized to frictionally engage the walls of a fluid passageway in order to retain the filter in a passageway or the retainer means may be a resilient retainer means for resiliently engaging the walls of the passageway. The retainer means is preferably a wire-like retainer which is circumscribingly attachable around only the periphery of the filter media, the central portion of the retainer being open. The filter media is attached to the retainer with the central portion of the filter media being free with respect to the retainer. The retainer means is normally chemically bonded to one side of the filter media with the edges of the filter media extending beyond the retainer means.

BRIEF DESCRIPTION OF THE DRAWINGS

The present invention will be better understood by reference to the examples of the following drawings:

FIG. 1 is a plan view of a preferred embodiment of the fluid filter of the present invention;

FIG. 2 is a sectional view along line 2—2 of FIG. 1; and

FIG. 3 is a partial plan view of another embodiment of the fluid filter illustrating the application of a mesh backing to one side of the fluid filter.

DETAILED DESCRIPTION OF THE PREFERRED EMBODIMENTS

Before explaining the present invention in detail, it is to be understood that the invention is not limited to the details of construction and arrangements of parts illustrated in the accompanying drawings, since the invention is capable of other embodiments and of being practiced and carried out in various ways commensurate with the claims herein. Also, it is to be understood that the terminology employed herein is for the purpose of description and not of limitation.

FIGS. 1-3 present a preferred embodiment of a fluid filter, generally designated 20, which exemplifies the present invention and are also used to exemplify a method of constructing a fluid filter. The illustrated embodiment is a fluid filter used in air makeup filtration systems for residential and commercial buildings. It is intended to be understood from this description that the claimed structure of the fluid filter 20 may be used to filter other fluids flowing through passageways, e.g., water, chemicals, gases, etc.

Referring to the example of FIG. 1, the invention may be described as being generally comprised of a sheet of filter media, generally designated 22, and a retainer means 24. The retainer means 24 is attachable to the filter media 22 and is used to retain the filter media 22 in a passageway. The retainer means 24 may be used in a passageway or duct which has stops, slots, or similar mechanical means of retaining the retainer means 24. In the preferred embodiment, the retainer means 24 functions as a snap-ring or retaining ring which independently retains the filter media 22 in the passageway or duct without other fasteners or support. Preferably the retainer means 24 is sized to frictionally engage the walls of a passageway which does not have stops, slots, etc. in order to independently retain the filter in the passageway. Most preferably, the retainer means 24 is made of resilient or flexible material and resiliently engages the walls of the passageway in order to independently retain the filter 20 in the passageway.

Preferably, the retainer means 24 takes the shape of a frame, also designated 24, having an open center. More preferably, the retainer means 24 is a wire-like retainer, also designated 24 which is circumscribingly attachable around only the periphery of the filter media 22, leaving the central area of the wire-like retainer 24 open. The retainer means 24 may be made of any material having characteristics similar to wire, i.e., resilience, strength, etc. The preferred retainer means 24 is made of metal wire. The inventor has found wire ranging from 10 gauge to 13 gauge to be satisfactory for most applications, the heavier gauges being used for larger filters.

The filter 20 may be constructed several ways. For example, two sheets of filter media 22 may be used with one sheet of filter media 22 attached on each side of a retainer means 24, the retainer means 24 being sandwiched between the filter media 22. Similarly, two retainer means 24 may be used, one retainer means 24 independently attached on each side of a sheet of filter media 22. Since the retainer means 24 functions as a snap-ring and not as a screen or structurally reinforcing frame for the filter media 22, there is no need to have mechanical connections between the retainer means on opposite sides of the filter media 22. In order to obtain the advantages of economy and simplicity, the preferred embodiment is constructed of one sheet of filter media 22 and one retainer means 24 with the retainer means being attached to one side of the filter media 22, as illustrated in FIGS. 1 and 2. Stated another way, the filter media 22 is attached to one side of the retainer means 24. The sheet of filter media 22 may be attached to the retainer means 24 in any desired manner, such as stapling, taping, sewing, tacking, etc. The fluid filter 20 may be utilized in two separate pieces, i.e., the filter media 22 may be placed in a fluid passageway and the retainer means 24 installed separately to retain the filter media 22 in the passageway. Preferably, the retainer means 24 is chemically bonded to the filter media 22. In the preferred embodiment the retainer means 24 is dipped in a latex glue and placed on the filter media 22, as exemplified in FIGS. 1 and 2.

The filter media 22, may be made of virtually any desired material which will attach to retainer means 24 and accomplish the desired filtration. The type of fluid to be filtered will dictate in most cases the best filter media to be used. The filter media 22 should be resiliently compressible to allow higher density packaging and shipping and the accompanying cost reductions. The filter media should also be cohesive so that it will not separate or rupture during use. If the filter 20 is to be used in air makeup filtration, the preferred filter media 22 is polyester or polypropylene. In the preferred embodiment, the filter media 22 is a non-woven synthetic filter media, or bonded polyester, available from Hobbs Bonded Fibers, P.O. Box 34888, Houston, Tex. 77234.

A mesh backing 26 as exemplified in FIG. 3, may be provided on one side of the filter media 22 to increase the life of the filter media 22 in industrial or commercial applications. Preferably, the mesh backing 26 is bonded to the filter media 22, although other fasteners, such as sewing, stapling, etc. will work.

The sheet of filter media 22 may be the same size as the retainer means 24, although in the preferred embodiment, best seen in FIG. 1, the sheet of filter media 22 is larger than the retainer means 24. The preferred filter media 22 has flexible edges 28 which extend beyond the retainer means 24. The edges 28 seal the passageway when the filter 20 is retained in a passageway so that all fluid flowing through the passageway will flow through the filter media 22. The edges 28 may be wrapped around the retainer means 24, and may be fixedly wrapped around the retainer means 24 by sewing, bonding, or other fastening. Preferably, as illustrated in FIG. 1, the edges 28 simply extend beyond the retainer means 24.

The preferred filter media 22 is only attached to the retainer means 24 near the outside edges or perimeter of the filter media 22, as illustrated in FIG. 1. The central portion 30 of the filter media 22 is left free with respect to the retainer means 24. This allows the central portion 30 to flex with respect to the retainer means 24 when the filter 20 is in use. The inventor has had an independent testing laboratory (Air Filter Testing Laboratories, Inc., 4632 Old La Grange Road, Crestwood, Ky. 40014)

conduct tests which have proven that this design greatly increases the efficiency of the filter. The tests established that the filter 20 in a 24 inch×24 inch size will operate at over 3,000 cubic feet per minute of air flow without rupturing or blowing out. At 3,000 cubic feet per minute the 24 inch×24 inch filter 20 of 0.375 inch thickness tested at 0.10 inch w.g. resistance, of 0.375 inch thickness with mesh backing tested at 0.15 inch w.g. resistance, and of 2 inch thickness with mesh backing tested at 0.53 inch w.g. resistance to air flow. The open center design of the fluid filter 20 allows the central portion 30 of the filter media 22 to flex into an arucate shape or pocket when the fluid filter 20 is in use. The inventor believes that it is this pocketing which increases the efficiency of the fluid filter 20.

While the invention has been described with a certain degree of particularity, it is manifest that many changes may be made in the details of construction and the arrangement of components without departing from the spirit and scope of this disclosure. It is to be understood that the invention is not limited to the embodiments set forth herein for purposes of exemplification, but is to be limited only by the scope of the attached claim or claims including the full range of equivalency to which each element thereof is entitled.

What is claimed is:

1. An article of manufacture comprising a fluid filter that will retain itself in a fluid passageway, said fluid filter consisting essentially of a single sheet of filter media and a single resilient retainer attached to one side only of the filter media, the sheet of filter media being larger than the resilient retainer, the filter media having flexible edges extending beyond the resilient retainer, the filter media edges being constructed and arranged to seal a passageway when the filter is retained in the passageway so that fluid flowing through the passageway must flow through the filter media, the resilient retainer comprising a single frame having an open center, and wherein the resilient retainer is a wire-like member attached to the filter media only near the outside edges around the periphery of the filter media, the center portion of the filter media being free with respect to the resilient retainer with no screens, cross members, structural pieces or frame present in the central portion of said retainer and filter media, so that there will be no impediment to the flow of fluid through the filter, said resilient retainer being constructed and arranged to function as a snap-ring or retaining ring which independently retains the filter media in said fluid passageway without further fasteners or support.

2. The structure as defined in claim 1 wherein the filter media is made of polyester.

3. The structure as defined in claim 2 wherein the resilient retainer consists of an external frame bonded to one layer of polyester with glue, and bonds with enough strength so that no other support is needed, and wherein the porosity of the filter media is not disturbed through the use of the gluing process.

4. The structure as defined in claim 3 wherein the polyester is both resilient and pliable so that it will conform to fit filter passageways which are not exact, and wherein the pliability of the filter allows it to self-seal along the face, and the edges fold back over thereby sealing the sides so that without other support this allows filtration over 100% of the open center.

5. The structure as defined in claim 4 wherein the filter is constructed and arranged to permit bulging to form a pocket thereby enhancing filtration efficiency.

* * * * *